March 23, 1965  R. L. HAMMETT  3,175,221
AUTOMATIC LOGGING METHOD
Filed March 26, 1963
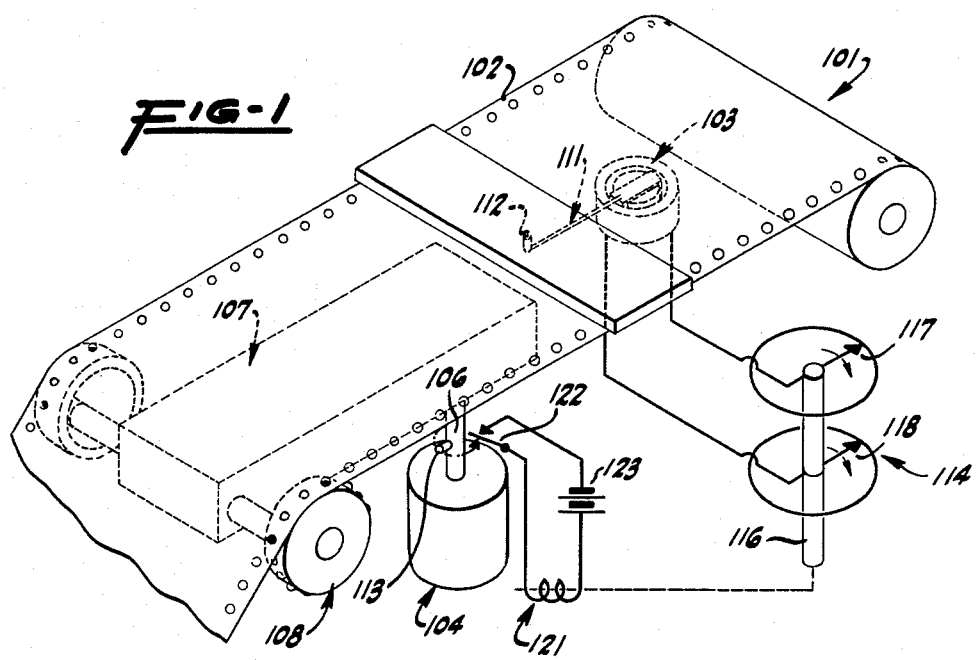
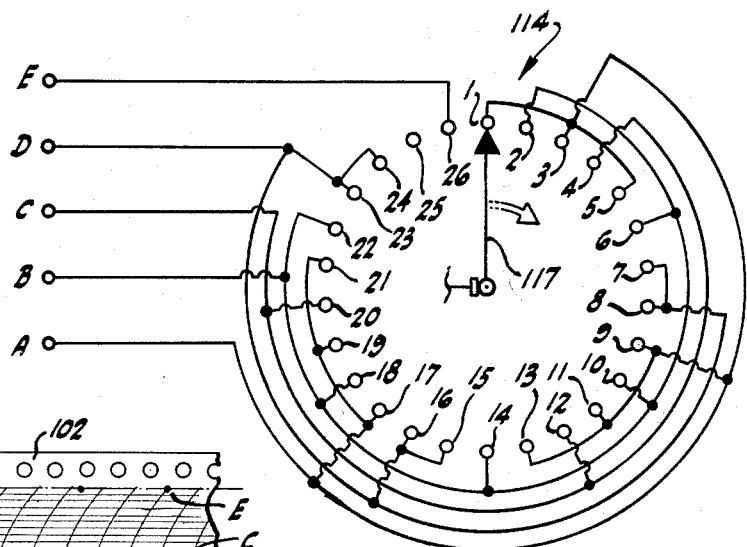
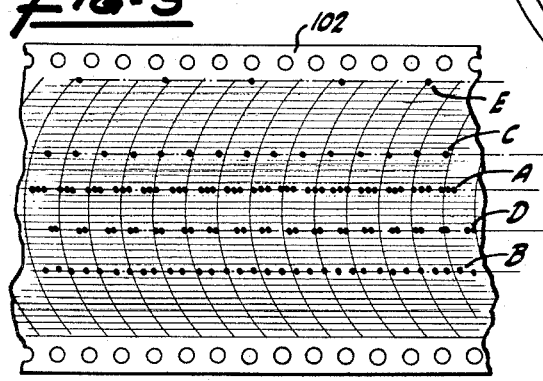
INVENTOR.
ROBERT L. HAMMETT
BY
Lippincott, Ralls & Hendricson
ATTORNEYS United States Patent Office 3,175,221
Patented Mar. 23, 1965

3,175,221
AUTOMATIC LOGGING METHOD
Robert L. Hammett, 1408 Alvarado Ave.,
Burlingame, Calif.
Filed Mar. 26, 1963, Ser. No. 268,094
2 Claims. (Cl. 346—1)

The present invention relates to an improved method and means for the automatic recording or logging of a plurality of parameters, as may relate, for example, to an electronic circuit such as a radio transmitter. More particularly, this invention provides for the marking upon a single moving tape of the values of a number of separate parameters, while maintaining the identity of each.

In the continuous monitoring or logging of parameters such as voltages, for example, it is conventional to employ chart recorders to produce a permanent record of time variations of the parameters. A chart recorder may have a pen mounted on a galvanometer arm and riding on a moving tape or the recording arm and tape may be periodically pressed together to produce a series of dots on pressure-sensitive tape. This latter type of recorder is herein employed and one such unit is produced, for example, by the Amprobe Instrument Corporation of Lynbrook, New York under the trade name "Amprobe Recorder."

Continuous recording may be accomplished by the use of a chart recorder for each function being monitored, or the use of specialized recorders having either a plurality of pens thereon, or a pen successively provided with different colored ink corresponding to separate signals received for recording. A multiplicity of recorders is quite costly both to purchase and maintain, while the limited number of parameters that can be recorded by specialized recorders, as well as the complexity and cost thereof, limit their applicability. In accordance herewith, a single recorder is employed to chart a plurality of parameters against time on one moving tape. Sequential energization of the measuring instrument by signals representative of separate parameters provides the chart information and individual identity of the separate recorded parameters is attained by the establishment of characteristic patterns for each parameter. A pulse-type recorder is employed to record dots on pressure-sensitive tape, and separate functions are sequentially recorded with identifying dot arrangements or codes.

An example of an application of this invention is found in the automatic recording of a number of parameters of a radio transmitting station. Individual parameters, such as output power, output frequency, transmitter output current to an antenna, plate voltage and current of the transmitter output, and the like, may be continuously logged in accordance herewith. Recorder input signals representative of these parameters are applied to a sensitive galvanometer in a predetermined sequence. The galvanometer arm is periodically pressed against the moving tape to impress dots thereon, and in accordance herewith, the sequence of different input signals is arranged to produce a pattern of dots for each parameter. Thus, the recording for each parameter is immediately apparent from a visual examination of the tape. A wide variety of sequencing may be employed for identification, and thus two consecutive dots may identify two signals representing plate voltage, three spaced dots may identify three signals representing plate current, and the like.

The necessity for some type of positive visual identification of the separate parameters arises from the fact that values of each parameter vary and thus the recorded trace of separate parameters may cross each other on the tape, particularly in the instance wherein a large number of parameters are recorded on one narrow tape. With the characteristic pattern of dots for separate parameters, no confusion can arise in reading the tape, and yet the complexity of prior art systems is precluded.

It is an object of the present invention to provide improved and simplified method and means for the automatic logging of a plurality of parameters which may vary with time.

It is another object of the present invention to produce a single recording of the values and variations with time of a plurality of parameters upon a single tape by the utilization of conventional chart recording means.

It is a further object of the present invention to provide for the sequential energization of a pulse-type chart recorder with signals representative of a plurality of different parameters in a predetermined sequential repetitive pattern, so that the resultant recording comprises a visually identifiable record of the values and variations in each of the parameters.

Various other possible objects and advantages of the present invention will become apparent to those skilled in the art from the following description of preferred steps of this invention and a single preferred embodiment of the apparatus hereof. It is not, however, intended to limit the present invention to the terms of the following description, but instead, reference is made to the appended claims for a precise delineation of the scope of the present invention.

This invention is illustrated in the accompanying drawings, wherein:

FIGURE 1 is a schematic illustration including portions of a chart recorder and control means therefor applicable to carry out the present invention;

FIGURE 2 is a wiring diagram of one deck of the stepping switch employed in the preferred embodiment of the apparatus of the present invention; and FIGURE 3 is a representation of a portion of a chart recorder tape containing markings formed in accordance with the present invention in a typical application thereof.

Considering first the method of this invention, it is noted that same may be advantageously carried out through the utilization of conventional pulse-type chart recorders. This type of apparatus is well known in the art, and is marketed, for example, under the trade name "Amprobe," although other companies also manufacture similar apparatus. Such a chart recorder provides for the periodic contact of a moving pressure-sensitive tape against a stylus upon the end of a galvanometer arm. This galvanometer, or other signal-responsive means, is energized from externally applied signals, so that the arm is laterally positioned on the tape in accordance with the magnitude of the signal applied to the galvanometer, and contact of the stylus at the end of the arm with the tape produces a dot upon the tape. The present invention operates to sequentially energize the signal-responsive means, such as a galvanometer, with signals from a plurality of different sources. Consequently the tape is marked with dots representing a plurality of different input signals or parameters. There is furthermore provided by the present invention method and means for the positive identification of the separate parameters recorded upon the tape. This is accomplished herein by the coding of the marks upon the tape. The signal-responsive means is energized by particular sequences of signals, so that certain different patterns of dots or marks occur upon the chart tape, and each of the patterns represents signals from a different source i.e., different parameters.

With regard to the coding of recorded information, the present invention provides for particular energization of a galvanometer that periodically has the arm thereof pressed against moving tape to form a dot on the tape at each such occurrence. Each time the tape moves, the galvanometer is briefly energized, as with a pulsed signal, to laterally position the arm on the tape in accordance with the magnitude of that signal. By interspersing the pulsed signals from different sources, the galvanometer then records the values of the signals from these separate sources, and the interspersing is herein coded. Thus, for example, the galvanometer may be successively energized three times with a signal representing frequency and will produce three closely-spaced dots on the moving tape, as a result thereof, and this may be followed by energizing the galvanometer with two successive pulse signals representing output power to form a pair of closely-spaced dots on the tape at some other lateral location. Repetition of the foregoing then produces a trace of three dots in a cluster spaced apart from another three dots in a cluster, so that an imaginary line through these spaced clusters of dots indicates the value and variation in frequency. There is also formed another record identified by two closely-spaced dots with a space and then two closely-spaced dots again along the tape, so that an imaginary line therethrough indicates the value and variation in output power. Both of these two measured parameters may vary considerably and actually the imaginary lines through the dots identified above may cross each other, but no confusion can arise as to which of the traces are which because frequency is represented by spaced clusters of three dots and output power is measured by spaced pairs of dots.

Apparatus capable of carrying out the present invention is illustrated in FIGURE 1 of the drawings. Referring thereto, it will be seen that a chart recorder 101 includes pressure-sensitive tape 102 mounted for movement across a galvanometer 103. A synchronous motor 104 steadily rotates a motor shaft 106, which operates through drive means 107 to rotate cogged wheels 108 engaging the tape and consequently moving this tape. Preferably in this type of chart recorder, the tape is moved in steps, i.e., although the average tape motion is constant, the instantaneous tape motion varies between a stationary position at actual recording and longitudinal tape traverse.

The galvanometer 103 may comprise a shielded internal core D'Arsonval galvanometer or D'Arsonval rectified galvanometer, having an arm 111 extending therefrom. At the end of this arm 111 there is provided a stylus 112, in this instance extending upwardly from the arm and adapted to periodically engage the tape 102. The drive motor 104 serves also to actuate tape movement means for periodically pressing the tape against the galvanometer arm stylus 112, so as to thereby form a dot upon the tape. It will be seen that the galvanometer is mounted so that the arm moves laterally of the tape in a large arc, in response to the signals applied at the galvanometer. Consequently, lateral displacement of the dot upon the tape is indicative of the amplitude of signals applied to the galvanometer.

A conventional chart recorder of the type described above normally includes a cam 113 upon the motor shaft 106. This cam serves to actuate periodic motion of the tape and periodic engagement of the stylus and tape. In accordance with the present invention, the motor 104 is also employed to actuate control means for applying pulsed signals to the galvanometer. This may be accomplished, for example, by utilizing the cam 113, which is shown in displaced position for clarity of illustration. As shown in FIGURE 1, the control means may include a stepping switch 114. This stepping switch is a double-decked switch having a shaft 116 from which extend separate movable contacts 117 and 118 upon separate decks of the switch. Stationary contacts are provided about each of the decks, and are sequentially engaged by the above-noted movable contacts 117 and 118. These movable contacts are connected to the galvanometer 103 for energization of the galvanometer, in accordance with signals applied between the stationary contacts of the two decks of the stepping switch, which are simultaneously contacted by the movable contacts 117 and 118 of this switch. The stepping switch shaft 116 is rotated in stepwise motion by a relay 121 which is, in turn, periodically energized in synchronism with the operation of the chart recorder 101. This synchronous operation is readily achieved by the provision of the microswitch 122 adjacent to the synchronous motor shaft 106 and positioned to be closed once each revolution of the shaft by the cam 113 thereon. The microswitch 122 may be connected in series with a battery 123 across the coil of the relay 121. It will be seen from the foregoing arrangement that operation of the motor 104 will thus serve not only to operate the chart recorder, but also to actuate the stepping switch 114 so that the movable contacts step forward one contact each time that the chart recorder moves the tape thereof forward one step. Phase relation between the stepping switch and chart recorder tape movement is attained by appropriate rotational positioning of the microswitch 122 relative to the cam 113 upon the motor shaft 106.

In accordance with the present invention, the signal-responsive means of the chart recorder, i.e., the galvanometer 103 of FIGURE 1, is sequentially energized in predetermined order, by a plurality of different input signals in a pattern of energization, in order that the dots appearing upon the chart recorder tape 102 shall positively identify the different input signals. This may be accomplished in the manner illustrated in FIGURE 2, wherein a wiring diagram of one deck of the stepping switch is illustrated. It will be appreciated that the second deck of the stepping switch is identically wired. Under those conditions wherein it is possible to record input signals with respect to ground, one side of the galvanometer may be grounded, and the stepping switch may be comprised of but a single deck. Alternatively, wherein a two-wire system is required, there is employed the two-deck stepping switch illustrated in FIGURE 1, with each deck wired in the manner illustrated in FIGURE 2.

Referring to FIGURE 2, it will be seen that five separate input terminals are provided, and these are therein identified by the letters A, B, C, D, E. This upper deck of the stepping switch 114 is provided with twenty-six stationary contacts, and for convenience, these contacts are numbered consecutively from 1 to 26, starting at the upper contact in FIGURE 2. The movable contact 117 is adapted to be stepwise rotated clockwise about the switch deck, so as to consecutively engage the stationary contacts 1 to 26. The individual stationary contacts are wired together in a particular predetermined order, so that there will be transmitted through the movable contact 117 a predetermined sequence of input signals from the terminals A to E. As illustrated, stationary contacts 1, 3, and 5 are connected together and to terminal A; stationary contacts 9, 11, and 13 are connected together and to terminal A; and stationary contacts 17, 19 and 21 are connected together and to terminal A. Consequently, an input signal at terminal A will thus be transmitted through the movable contact of the stepping switch to the galvanometer 103, as the movable contact engages the stationary contacts 1, 3, 5, 9, 11, 13, 17, 19 and 21. It will be seen that this sequence of signals will produce a particular dot pattern upon the chart recorder. Terminal B is connected to stationary contacts 2, 6, 10, 14, 18, and 22, which are wired together. Terminal C is connected to stationary contacts 4, 12, and 20. Terminal D is connected to contacts 7 and 8 wired together, contacts 15 and 16 wired together, and to contacts 23 and 24 wired together. The last terminal E is connected to sole contact 26.

Stepped rotary motion of the movable contact 117 will thus be seen to place this contact sequentially into engagement with stationary contacts, electrically connected to input terminals A, B, A, C, A, B, etc., about the stepping switch. Consequently, the galvanometer 103 of the chart recorder is sequentially energized from separate input terminals, and the pattern of the sequence is determined by the wiring of the stepping switch. There is thus produced upon the tape 102 of the chart recorder separate patterns of dots or marks corresponding to the sequential pattern of galvanometer energization from the individual input terminals.

In FIGURE 3 there is illustrated a portion of chart recorder tape 102, upon which there has been recorded signals applied to the recorder galvanometer from the terminals A, B, C, D, and E. Signals received from terminal A will be seen to be recorded as a succession of three dots, spaced apart from the next three dots. Signals received from terminal B are a plurality of spaced-apart individual dots. Signals received from terminal C are a plurality of widely-spaced dots. Signals received from terminal D are a plurality of pairs of dots, with spacings between the pairs, and signals received from terminal E are very widely-spaced dots. There will thus be seen to be provided characteristic markings upon the tape corresponding to signals received from each of the input terminals. Within the period required for the rotary contact of the stepping switch to make one complete revolution, there are recorded twenty-five dots upon the tape. These dots are comprised as three groups of three closely-spaced dots representative of input signals from terminal A, a group of six evenly-spaced dots, representative of signals from input terminal B, a group of three evenly-spaced dots, representative of signals from input terminal C, four pairs of dots evenly-spaced apart between pairs, representative of signals from input terminal D, and a single dot representative of input signals from terminal E. It will be seen from FIGURE 3 that the marks corresponding to signals from different input terminals are readily distinguished from each other, because of the particular patterns of marks provided. This situation is highly advantageous, inasmuch as one viewing the tape may then immediately visually identify the separate parameters measured and recorded. Furthermore, under the circumstances wherein the tape has a minimum width, as would result in small-sized chart recorders, the different parameters are readily identifiable without confusion, even though there is little lateral spacing between marks corresponding to separate parameters. This is even more important under those circumstances wherein sufficient fluctuation in the input signals occurs for the lateral displacement of the dots corresponding to one parameter to vary sufficiently to cross over the line of dots corresponding to another parameter. Under this circumstance, it is, of course, of extreme importance that no confusion arise in reading of the tape, and the patterned sequence of marks provided by the present invention precludes such confusion.

It will be appreciated, of course, that the above-described embodiment of the apparatus of the present invention is only exemplary thereof. Quite clearly, the stepping switch, illustrated and described in conjunction with the present invention, may be readily replaced with alternative apparatus. Insofar as the method of this invention is concerned, it is provided hereby that the signal-responsive means of the chart recorder shall be sequentially energized with signals representative of different parameters in particular predetermined patterns. This may be accomplished by a plurality of relays, for example, or electronically by the utilization of gate circuits. In addition, the particular patterns employed, in accordance with the present invention, may also be varied at the option of the one practicing the invention. Thus, the particular wiring illustrated in FIGURE 2, for example, is only exemplary of one suitable pattern sequence, and in the event that more parameters are to be measured, or that different patterns are employed, it is only necessary to rewire the stepping switch in this illustrated embodiment of the present invention or to, alternatively, set up other sequence control means, such as relays or electronic circuitry.

In addition to the recording of parameters, as set forth above, provision may also be made for automatically causing an alarm or control signal to be produced upon predetermined amplitude fluctuations in the measured value of any of the parameters. This may be accomplished from the recorder itself or by external means such as relay-operated circuitry in the input lines. For many applications of the invention, such as radio transmitter logging, alarm or control means are quite important and thus form a normal part of the system.

While the present invention has been described above in connection with particular preferred steps of the method of this invention, and a single preferred embodiment of the apparatus hereof, it is not intended to limit the invention by the terms of this description. It is believed clear from the foregoing description that substantial advantages are available through the practicing of this invention, for it is hereby provided that a material reduction in complexity of logging or monitoring apparatus may be attained, and furthermore, that one, single chart-recording tape may be produced with visually identifiable records of the time variation and value of a large plurality of different parameters. Reference is made to the following claims for a precise definition of this invention.

What is claimed is:

1. An improved method of chart recording a plurality of different parameters represented by separate signals comprising the steps of periodically engaging a stylus of a galvanometer with a moving tape to form successive dots on the tape, sequentially energizing said galvanometer with said separate signals to deflect the galvanometer stylus in proportion to the signal amplitudes, energizing the galvanometer with different signals in predetermined order in which each parameter signal is repeated differently from the others, and repeating the order of galvanometer energization for producing a characteristic pattern of dots on the tape for each parameter.

2. An improved method of logging a plurality of variable parameters upon a single moving tape comprising the steps of generating separate electrical signals representative of the separate parameters, periodically marking the moving tape at laterally deflected positions corresponding to signal amplitude, to form a succession of dots on the tape with each dot representing the instantaneous value of a parameter signal, and forming the dot from signals of different parameters in predetermined repeating order, in which the repetition of each signal is different from the others, so that a characteristic marking pattern is produced for each parameter whereby visual identification of separate parameter amplitude variations with time is facilitated.

References Cited by the Examiner
UNITED STATES PATENTS

| | | | |
|---|---|---|---|
| 1,641,199 | 9/27 | Roucka | 346—34 |
| 2,232,829 | 2/41 | Ross | 346—1 |
| 2,565,008 | 8/51 | Wallace | 343—200 |
| 2,635,034 | 4/53 | Haviland | 346—109 |
| 2,743,986 | 5/56 | Bradner | 346—46 |
| 2,775,503 | 12/56 | Peterson | 346—109 |
| 3,042,922 | 7/62 | Ledbetter | 346—45 |
| 3,050,731 | 8/62 | Usdin | 346—1 |
| 3,061,813 | 10/62 | Geyer | 340—15.5 |

LEO SMILOW, Primary Examiner.

LEYLAND M. MARTIN, Examiner.